(12) United States Patent
Panda et al.

(10) Patent No.: US 8,825,727 B2
(45) Date of Patent: Sep. 2, 2014

(54) SOFTWARE-HARDWARE ADDER

(75) Inventors: Subrat K. Panda, Bangalore (IN);
Niranjan Vaish, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 327 days.

(21) Appl. No.: 13/420,885

(22) Filed: Mar. 15, 2012

(65) Prior Publication Data

US 2013/0246491 A1    Sep. 19, 2013

(51) Int. Cl.
*G06F 7/00* (2006.01)

(52) U.S. Cl.
USPC ............ 708/200; 708/204; 708/209; 708/505

(58) Field of Classification Search
None
See application file for complete search history.

(56) References Cited

U.S. PATENT DOCUMENTS

| | | | |
|---|---|---|---|
| 5,390,135 A * | 2/1995 | Lee et al. | 708/518 |
| 5,491,650 A | 2/1996 | Barhen et al. | |
| 6,131,107 A * | 10/2000 | Wolrich et al. | 708/630 |
| 6,260,055 B1 * | 7/2001 | Sugeno et al. | 708/518 |
| 7,509,366 B2 * | 3/2009 | Hansen | 708/501 |
| 7,516,320 B2 | 4/2009 | Khan et al. | |
| 7,991,817 B2 | 8/2011 | DeHon et al. | |
| 2004/0049729 A1 | 3/2004 | Penfield | |
| 2010/0023574 A1 | 1/2010 | Rigge | |
| 2010/0241828 A1 | 9/2010 | Yu et al. | |

FOREIGN PATENT DOCUMENTS

JP     2007257446     10/2007

* cited by examiner

*Primary Examiner* — Michael D Yaary
(74) *Attorney, Agent, or Firm* — Parashos T. Kalaitzis; Robert C. Rolnik

(57) ABSTRACT

A data processing system, method and computer program product to receive general-purpose code for iterative summation of an aggregate number of addends, wherein each addend has a precision. The data processing system operates an arithmetic hardware unit to set a first set of input registers to be a target of memory mapped registers and uses a broad-based adder to generate an adder result, wherein the broad-based adder has a broad-based adder size of inputs, and the broad-based adder size is less than the aggregate number of addends and greater than two, wherein each input register of the first set of input registers is connected to each input. Further, the data processing system may write the adder result to a storage array in memory, wherein the adder result is the sum of the inputs, and the adder result is placed in the storage array as indexed by a storage array index.

25 Claims, 7 Drawing Sheets

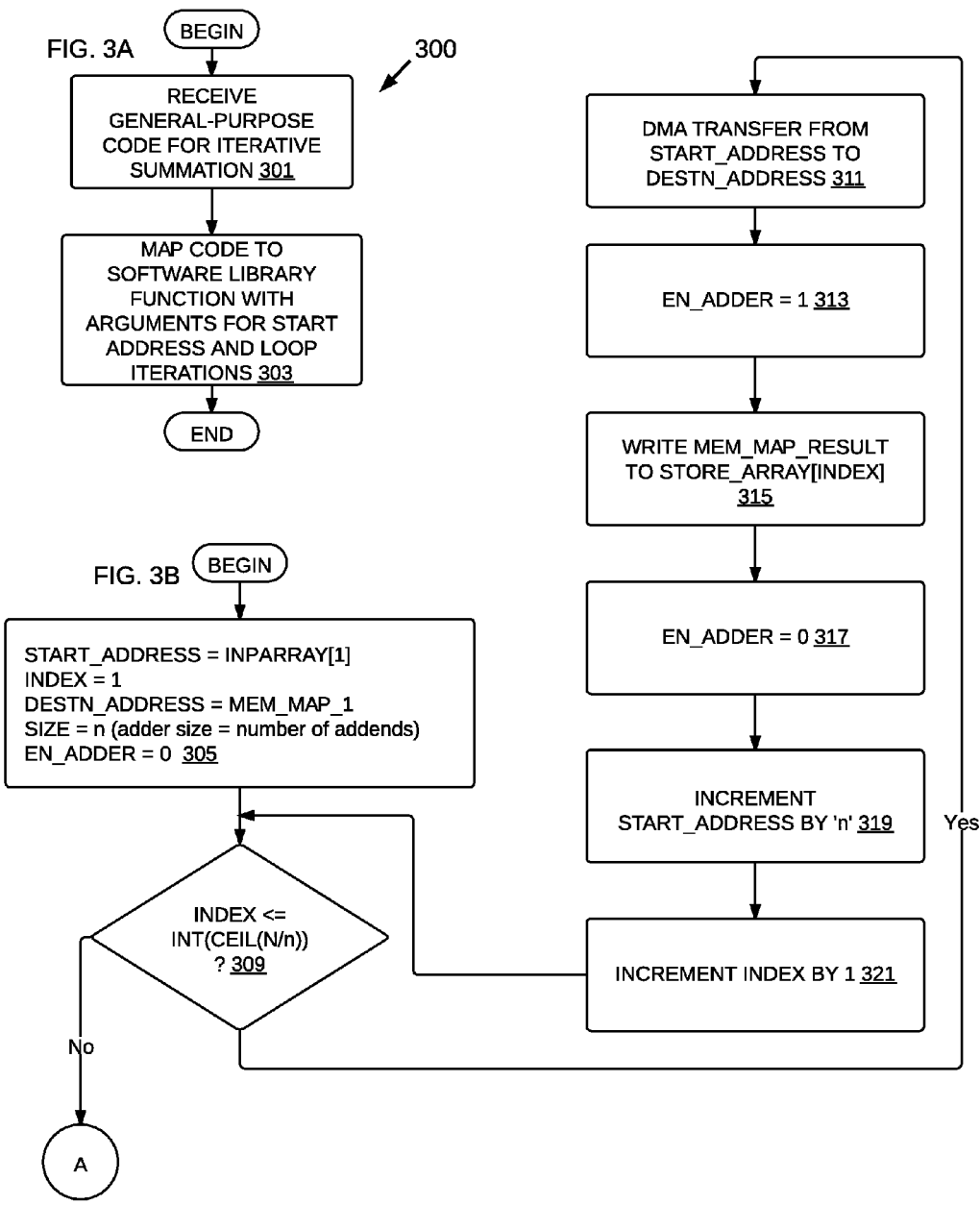

SOFTWARE-HARDWARE ADDER

BACKGROUND

The present invention relates to a computer implemented method, data processing system, and computer program product for making and/or using a special purpose adder, and more specifically to the design of the adder with associated signals and instructions to use the adder.

Most central processing units (CPU) provide general purpose arithmetic functions that sum two addends stored as binary numbers, per adder, at one time. Designers of such CPUs provide such a function since it can be implemented in a compact space on silicon or other substrates and permit a broad range of mathematical functions to be performed according to machine instructions. As such, the CPUs are used in a wide variety of arithmetic. The task of using the hardware efficiently is then handed over to software developers.

However, the dual input adders of the past suffer from the limitation that for large quantities of numbers that are to be summed together, the CPU must iterate on the order of logarithm base 2 of the quantity of numbers to be summed.

SUMMARY

According to one embodiment of the present invention a computer receives general-purpose code for iterative summation of an aggregate number of addends, wherein each addend has a precision. The computer sets a first set of input registers to be a target of memory mapped registers. The computer uses a broad-based adder to generate an adder result, wherein the broad-based adder has a broad-based adder size of inputs, and the broad-based adder size is less than the aggregate number of addends and greater than two, wherein each input register of the first set of input registers is connected to each input. The computer writes the adder result to a storage array in memory, wherein the adder result is the sum of the inputs, and the adder result is placed in the storage array as indexed by a storage array index. The computer increments the first memory address by the broad-based adder size, wherein an increment corresponds to the precision. The computer increments the storage array index corresponding to the storage array. The computer determines whether no unsummed addends remain. The computer sums the storage array in memory to obtain a final sum, responsive to a determination that no unsummed addends remain.

BRIEF DESCRIPTION OF THE SEVERAL VIEWS OF THE DRAWINGS

FIG. 3A is a flowchart of a compiler method for converting conventional human-readable machine instructions into signals and functions corresponding to hardware adder embodiments in accordance with an illustrative embodiment of the invention;

FIG. 3B is a flowchart of machine instructions and/or signals generated by the compiler method in accordance with an illustrative embodiment of the invention;

DETAILED DESCRIPTION

Figure 1:
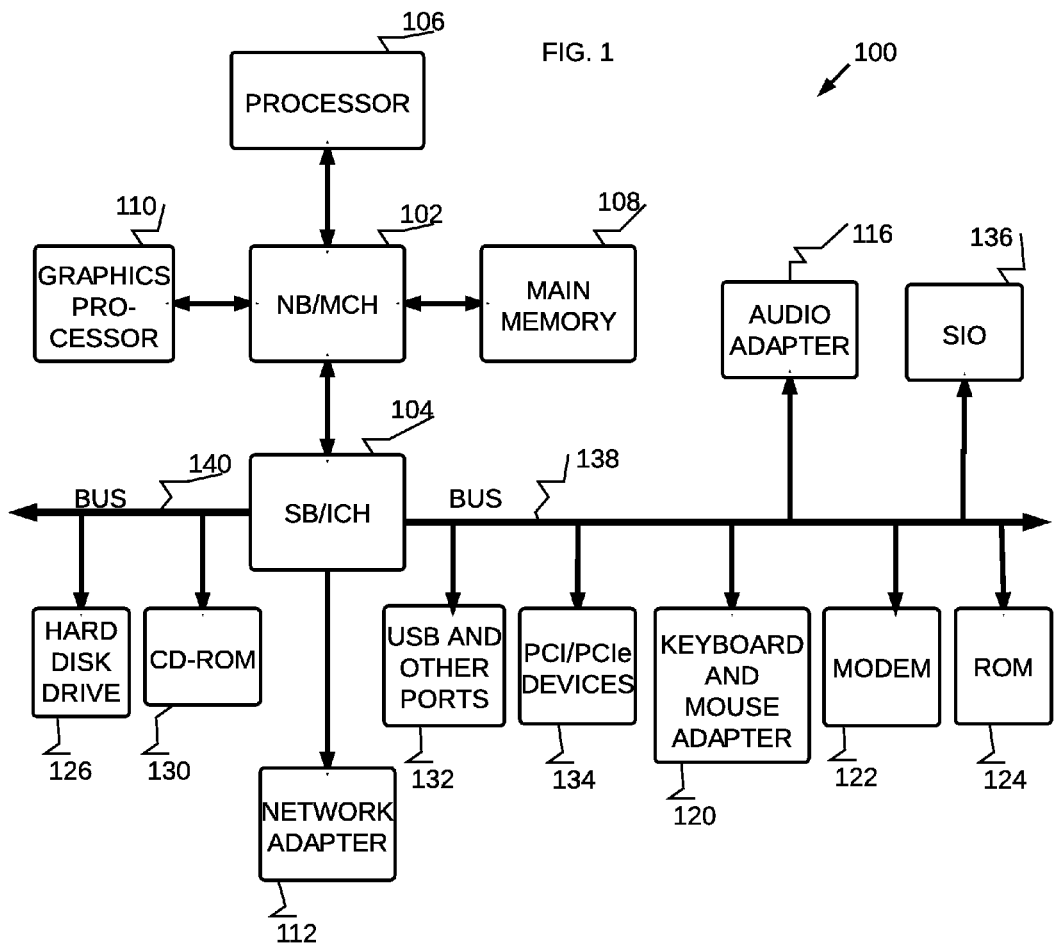
FIG. 1 is a block diagram of a data processing system in accordance with an illustrative embodiment of the invention.

With reference now to the figures and in particular with reference to FIG. 1; a block diagram of a data processing system in which aspects of an illustrative embodiment may be implemented. Data processing system 100 is an example of a computer in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106 which coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on computer readable tangible storage devices, such as hard disk drive 126, and may be loaded into main memory 108 for execution by processor 106. The processes of the embodiments can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus, and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, one or more embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage device(s) may be utilized. A computer readable storage device may be, for example, but not limited to, an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device. The term "computer readable storage device" does not encompass a signal propagation media such as a copper cable, optical fiber or wireless transmission media.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The illustrative embodiments described below show how one or more embodiments may rely on general-purpose code for iterative summation to establish a storage array used to drive one or more add operations by at least one broad-based adder, thereby adding plural addends in a single pass of the broad-based adder. The size of the broad-based adder can be, for example, sixteen inputs but it must be at least as three inputs. Any unused input may be set to zero. Reliance on direct memory access to input addends to the broad-based adder further speeds the operation, as well as direct memory access to store sums and intermediate sums to memory, such as, for example, the storage array. Some illustrative embodiments can work with floating point inputs while keeping errors to known small amounts relative to the sum. In addition, software designers, accustomed to writing code in a commercial programming language, may need to make no changes in their code to identify large blocks of addends that are to be summed. One or more embodiments can: a) recognize plural forms of iterative or looping summation instructions; and b) select a special purpose adder circuit and corresponding support circuits to accomplish more parallel computation and associated speed improvements.

Figure 2:
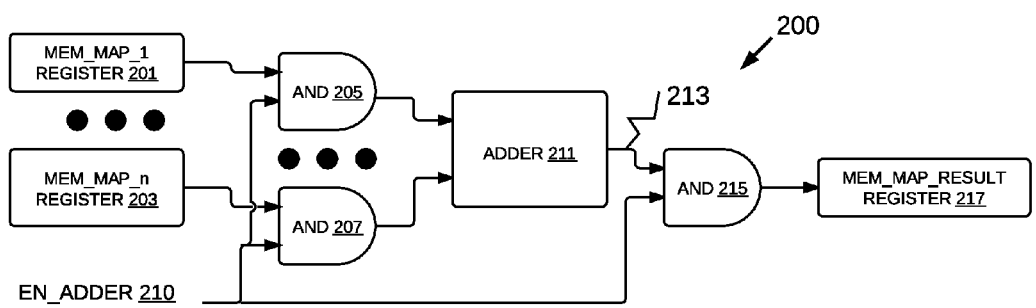
FIG. 2 is a hardware-implemented fixed point adder, or arithmetic hardware unit (AHU), in accordance with an illustrative embodiment of the invention.

FIG. 2 is a hardware-implemented fixed point adder, or arithmetic hardware unit (AHU), in accordance with an illustrative embodiment of the invention. A first set of input registers may be memory mapped to AND gates 205 and 207. The input registers may be, for example, bounded by mem_map_1 register 201 and mem_map_n register 203 to include n addends specified using general-purpose code. In other words, there are 'n', or the broad-based adder size, registers that can supply inputs to the adder 211. General-purpose code is any code that can be used to describe addition of addends by using a loop-expression. Accordingly, a first memory mapped address can be either an address of an upper bound, e.g., mem_map_n, or lower bound, e.g. mem_map_1, to memory presented at the inputs of AHU. The second memory address is the other end to the storage of addresses. In other words, a first memory mapped address is offset from a second memory mapped address by the broad-based adder size, 'n', minus 1 offset from the second memory mapped address. A signal, en_adder 210, can effectively gate signals from mem_map_1 register 201 through mem_map_n register 203 to inputs of adder 211. Adder 211 of the target system generates the adder result 213. An adder result is a resultant sum of all values appearing at the inputs of the broad-based adder. Conventional adders used in many processors take only two addends as inputs. A broad-based adder, on the other hand, is an adder that accepts three or more addends. En_adder 210 can further gate the result of adder 211 by using AND gate 215. Such a result, appearing at AND gate 215, output is stored to mem_map_result register 217 for processing in a further stage or cycle of hardware. The storage array and general-purpose code are explained further with respect to FIGS. 3A, 3B and 3C, below. The storage array is processed either as a whole or in multiple iterations of blocks of addends by reference to, for example, mem_map_1 register 201 through mem_map_n register 203. As such, the storage array can be processed as blocks of addends at a time when the addends exceed the inputs of the adder.

FIG. 3A is a flowchart of a compiler method for converting conventional human-readable machine instructions into signals and functions corresponding to hardware adder embodiments in accordance with an illustrative embodiment of the invention. A data processing system performs compilation 300 to obtain necessary instructions and signalling for a hardware embodiment the couples a processor to a broad-based adder, explained below. Initially, a data processing system, such as data processing system 100 of FIG. 1, may receive general-purpose code for iterative summation of an aggregate number of addends (step 301).

The data processing system may compile code in a conventional manner until it locates general-purpose code for iterative summation embedded in a larger body of code. A general-purpose code for iterative summation of aggregate number of addends is a code written in a programming language that may be stored to memory, non-volatile storage or any recording device. More specifically, the general-purpose code for the iterative summation of aggregate number of addends is a code that may describe a looping execution of plural adds with respect to addends in a storage array. Further, the general-purpose code for iterative summation of aggregate number of addends is a code may rely on a storage array index to describe specific stored elements of the storage array. These elements can be the original addends or they can be intermediate sums that rely on the storage array as a kind of scratch pad to store partial sums or subtotals. The loop can be implemented in any one of several ways. The loop can be a 'for' loop that describes a beginning point of the storage array and a final point or address of the storage array wherein addends are bounded by the beginning point and the final point. Alternatively, other instruction forms of a loop can be used such as a 'while' loop. A further form of instructions can be instructions to determine that unsummed addends remain, and upon making that determination, performing a 'goto' statement that returns control to machine instructions at or prior to a serial addition instruction or a storage array index incrementing instruction. Each form of looping execution can be located using search algorithms, for example, regular expressions, to detect the loop and its component parts, including the storage array description. Further steps may include reliance on variable definitions that describe the array in abstract terms. In other words, the compiling computer can determine the array's, or other storage structure's, physical memory allocation from place code segments where the array is defined in the general purpose code.

As can be appreciated, many forms of looping to use an index to serially add storage array elements is within the scope of the meaning of general-purpose code for iterative summation. An example of general-purpose code for iterative summation of aggregate number of addends appears as 'C' language loop shown below.

TABLE 1

| Line Number | Code |
|---|---|
| 1 | sum= 0; |
| 2 | for (i=1; i<=N; i++) |
| 3 | sum += inpArray[i]; |

The data processing system, as part of receiving general-purpose code for iterative summation may detect the presence of such general purpose code. Detecting the pattern can be on the basis of setting a lexical parser to locate key-words embedded in the body of code and detecting the loop initialization and conclusion. For example, a regular expression function can be used to detect the 'for' and any loop that traverses a data structure to accumulate a sum.

Accordingly, the loop specifies a storage array index using the variable 'i', having a lower bound of '1' and an upper bound using the number represented by 'N'. Accordingly, 'N' is the number of addends, at least based on a lowermost index of 1. The number of indexed values in the storage array is the aggregate number of addends. In other words, the aggregate number of addends is the number of addends for which a common sum is required, as stated by the general-purpose code. Next, the data processing system may map the general-purpose code to a software library function with arguments for start address and loop iterations (step 303). Processing may terminate thereafter. One result of step 303 is the recording of executable code, described in detail at FIG. 3B, to a storage device for later use and incorporation into a target system.

FIG. 3B is a flowchart of machine instructions and/or signals generated by the compiler method in accordance with an illustrative embodiment of the invention. The flowchart can be the product produced when the compiler data processing system of FIG. 1 operated in the manner of FIG. 3A produces executable code and such code is stored to a specialized data processing system that accesses adder 200 of FIG. 2 referred to simply as the target system. The target system can generally be constructed the same as data processing system 100, except that the processing unit additionally is equipped with adder 200 and supporting circuits.

General-purpose code for iterative summation is used to set initial values for parameters to control the adder and its interaction with memory (step 305). This step involves the target system using memory in storage array, InpArray. The target system, using directions established in executable code, sets a start address variable, namely, start_address, to InpArray[1], the first indexed position in the storage array. A storage array is memory-stored values that can be addressed using an index, for example, in sequence, by incrementing the index. A storage array index is a value or address used to reference addends stored in the storage array. The storage array index may, for example, be an offset that is added to a base memory reference to obtain a specific physical address in memory. Step 305 uses the variable, 'index', as the storage array index, and initializes it to be 1. An addend is a value described, at least abstractly, to be added. A compiled version of general-purpose code, coupled with the data processing system described above, and data inputs can more directly describe the addends that are to be added for a given situation.

Further initializing by the compiler sets destn_Address to mem_map_1, a memory accessible by direct memory access. The variable, "destn_Address", can be used to define a storage location for a sum or a subtotal. Further, the compiler can set the variable, 'size', to a value that is the number of inputs or addends that the broad-based adder can simultaneously add. In other words, a broad-based adder size is the maximum number of addends that the broad-based adder can simultaneously add. The broad-based adder size may also be referred to as the number 'n', which, for example, can be 16. The broad-based adder size can be hardwired in the supporting circuit implementation, which can be provided on a common semiconductor substrate with the broad-based adder. The broad-based adder size must be three or larger. In addition, further initialization sets the enable adder signal, en_adder, to 0. En_adder is the signal en_adder 210 of FIG. 2, above. At times when the storage array is exhausted and the number of addends is fewer than the broad-based adder size, the unused adder inputs can be set to zero during that pass. The storage array can be exhausted during a final pass that sums a last remaining batch of unsummed storage array values. An en_adder setting of zero disables the broad-based adder from immediately receiving inputs or generating a corresponding sum.

Next, the target system compares the index to the ceiling of the quotient of the aggregate number of addends, N, in the storage array divided by the size of the plural input adder (step 309). This ceiling can be expressed as an integer. The comparison determines if the index is less than or equal to the ceiling thus stated. The result will be negative if no unsummed addends remain. An unsummed addend is an addend that has not been summed by the broad-based adder at least once. Only addends from the storage array can be included aming unsummed addends. Once an addend from the storage array is summed to at least reach a subtotal, the addend is no longer an unsummed addend. A positive determination may cause the target system to direct memory access (DMA) transfer the storage array. A direct memory transfer is synonymous with a DMA transfer. The target system makes this transfer by using memory addresses that define the storage array's lowest and highest memory locations, for example, as defined by start_address to destn_address (step 311). Accordingly, the set of input registers (201-203 of FIG. 2) may be targets of memory mapped memory. Next, the target system may enable the adder by setting the en_adder line to logical one, which may be represented by a high voltage on the en_adder line (step 313). The en_adder line is en_adder 210 of FIG. 2, which, when coupled to AND gates 205, 207 of FIG. 2 and the corresponding gates to intermediate registers, drives the inputs to adder 211 causing the adder to sum the plural inputs and present the corresponding adder result to AND 215. The adder result propagates through AND 215 to be presented to mem_map_result register 217. Register 217 can be written to the storage array, 'store_array[ ]' as indexed by storage array index, 'index' (step 315). An adder result is thus written to a storage array in memory as indexed by the storage array index. In a hardware-implemented embodiment that has an en_adder line, the target system sets the en_adder to 0 (step 317).

Next, the target system may increment start_address by 'n', the broad-based adder size (step 319). Similarly, the storage array index, 'index' is incremented by 1 (step 321). The target system may subsequently perform step 309, again comparing the index, as incremented to the ceiling described above.

After sufficient iterations through the 309-321 loop occur, the target system increments the storage device index sufficiently for the target system to obtain a negative result at step 309. The negative result is consistent with no unsummed addends remaining from the data originally in the storage array at step 305. Processing may continue at FIG. 3C as a result. At this time, positions 1 through ceil(N/n) of the storage array are occupied by subtotals from the first pass of addends through the broad-based adder, where ceil( ) is a ceiling operation. These subtotals are then further processed to aggregate further subtotals.

Figure 3C:
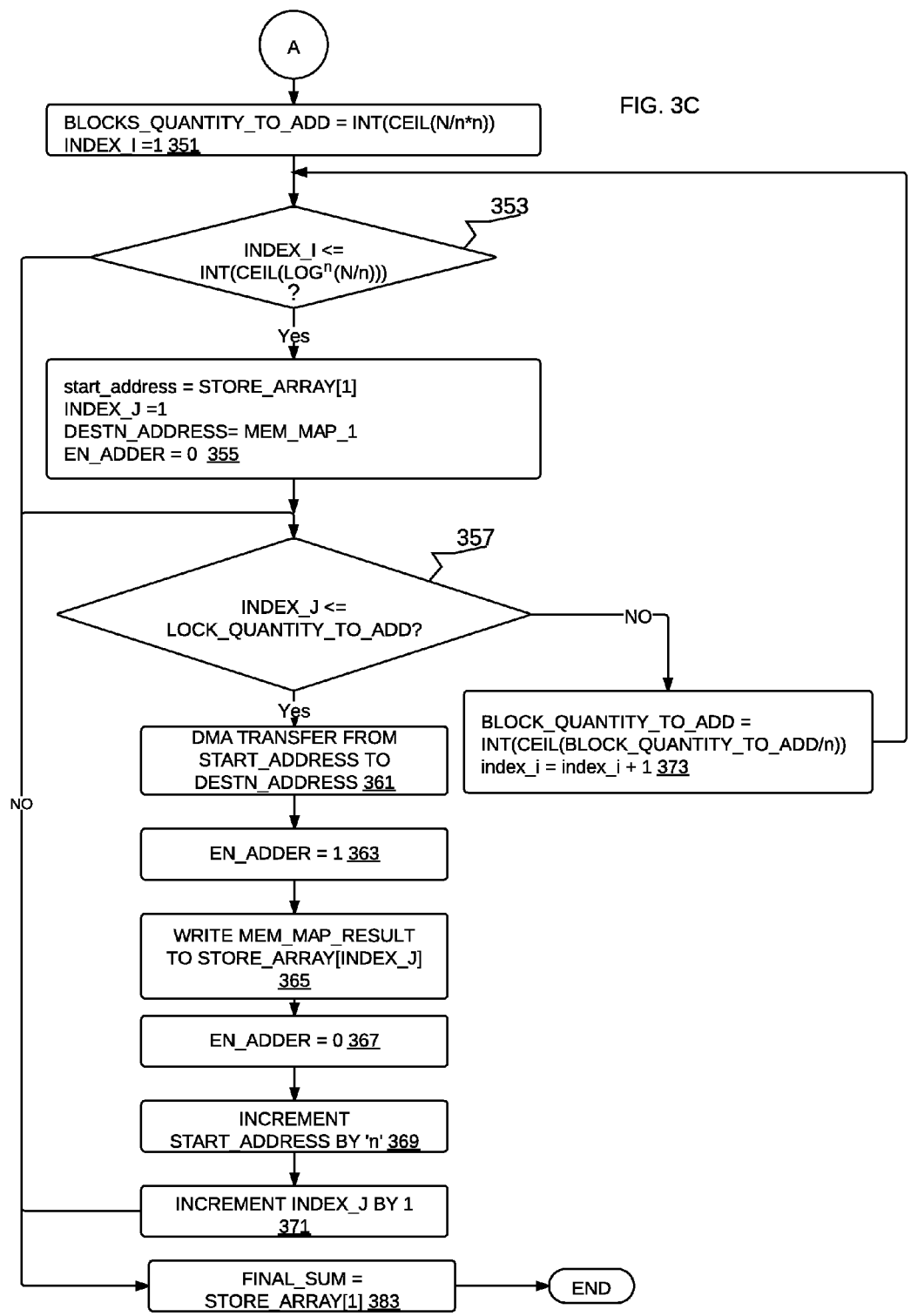
FIG. 3C is a continuation of a flowchart of machine instructions and/or signals generated by the compiler method in accordance with an illustrative embodiment of the invention.

FIG. 3C is a continuation of a flowchart of machine instructions and/or signals generated by the compiler method in accordance with an illustrative embodiment of the invention. The flowchart of FIG. 3C shows the target system summing the storage array in memory to obtain a final sum. A final sum is the sum of the aggregate addends, allowing for truncation and other errors. The target system initializes the outer loop. The outer loop is the steps 353 through step 373, where step 353 determines whether conditions have been met to leave the loop. Accordingly, the target system iterates through this outer loop, specifically, traversing the entire storage array in memory. The target system may set the block quantity (of blocks) of numbers to add. This block quantity can be the ceiling of the quotient of the total number of addends (initially in the storage array) divided by the square of the adder size, 'n' (step 351). The block quantity may be the number of iterations that the target system will use the adder to determine subtotals for the current pass through the inner loop. The inner loop is steps 357 through step 371. Further, as part of step 351, the target system may set an outer loop counter to one, where, in this case, the outer loop counter is named 'index_i'. Next the target system may determine whether a first exit condition is met, namely, whether the outer loop counter is less than or equal to the ceiling of log base-n of the quotient of the number of addends in the storage array divided by the size of the broad-based adder (step 353). The logarithm is computed with respect to a base of the adder size, n. The inequality determination at step 353 is an exit condition that is met when the inequality is false, or the determination is negative. In other words, the exit condition is met when the outer loop counter exceeds the ceiling.

However, provided the result of step 353 is positive, the target system initializes another pass of the broad-based adder by setting the start_address to the first indexed position of the storage array, store_array[1], initializing the inner loop counter to 1 (index_j=1), setting destn_address to mem_map_1, and disabling the broad-based adder by setting the en_adder line to zero (step 355).

Next, the target system determines if the inner loop counter is less than or equal to the first block quantity to add (step 357). If the result of step 357 is positive, the target system may direct memory access (DMA) transfer from start_address through to the destn_address in the broad-based adder (step 361). The target system may set the en_adder line high (step 363). In other words steps 361 and 363 combine to transfer the memory_map_1 register 201 of FIG. 2, mem_map_n register 203 of FIG. 2, and all registers sequentially between to be added at adder 211 of FIG. 2.

Next, the target system writes the mem_map_result to the storage array indexed by the inner loop counter, namely, index_j (step 365). The target system sets en_adder to 0 (step 367) thereby disabling the broad-based adder. Next, the target system increments the start_address by the broad-based adder size, n (step 369). Also, the target system may increment the inner loop counter, index_j by 1 (step 371). Processing resumes at step 357.

If the result of step 357 is negative, the target system recalculates the block quantity of numbers to add, this time the block quantity to add is the ceiling of the quotient of the previous block quantity to add divided by the size of the adder, n. Further, the target system increments the outer loop counter, index_i by one (step 373). Processing continues at step 353.

A negative result at step 353, or a determination that the exit condition is met, can cause the target system to store an output of the broad-based adder as the a final sum (step 383). Processing may terminate thereafter.

Figure 4:
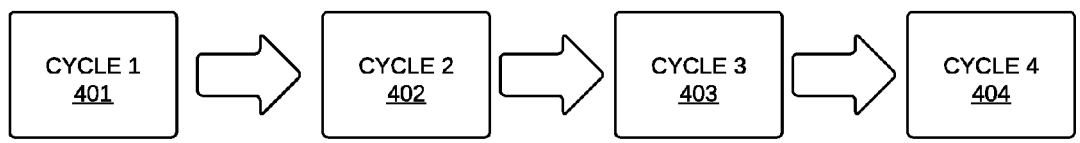
FIG. 4 is a diagram of cycles that use hardware embodiments to sum n floating point addends having p-bit positions of precision in accordance with an illustrative embodiment of the invention.

FIG. 4 is a diagram of cycles that use hardware embodiments to sum n floating point addends having p-bit positions of precision in accordance with an illustrative embodiment of the invention. The hardware of FIG. 4 and FIGS. 5 A-D can use, for example, floating point numeric precision represented as described in IEEE 854 double-precision floating point standard. P-bit positions describe the widest precision of bits that an addend can have to be added by the plural-bit adder. The adder can be designed to have p-bit positions such that 'p' is larger than the mantissa bit size in the mantissas to be added. Cycle 1 401 determines a maximum exponent for a given block of addends that are to be presented to the broad-based adder in Cycle 3, FIG. 5C, below. Cycle 2 402 converts a floating point addend by revising each addend to have the same exponent and shifting the mantissa accordingly to an adjusted significand. An adjusted significand is a mantissa that continues to use a floating point representation, however, the significand is not normalized (see IEEE 854). Cycle 3 403 presents those mantissas to the broad-based adder for summing. Cycle 4 404 renormalizes the significand and rounds in response to bits being truncated from the result.

Figure 5C:
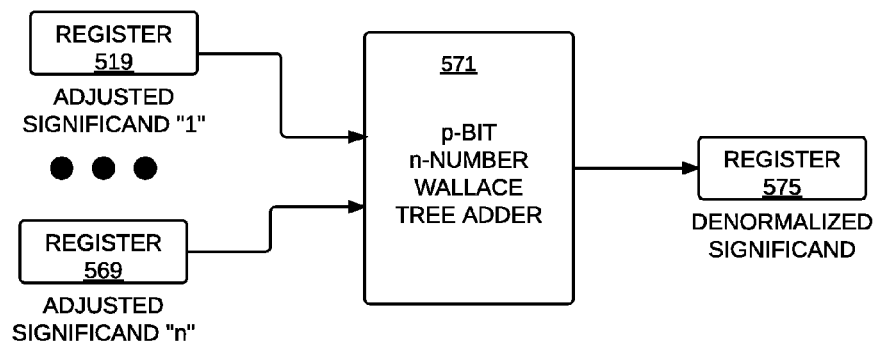
FIG. 5C is a block diagram of a third stage or cycle in summing plural inputs in accordance with an illustrative embodiment of the invention.
Figure 5D:
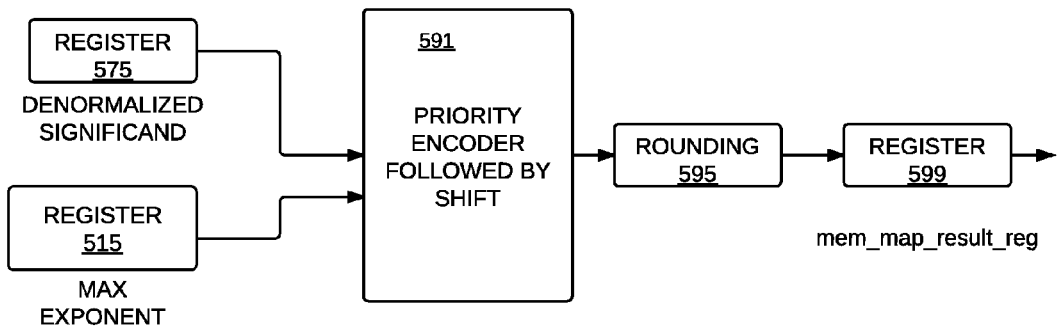
FIG. 5D is a block diagram of a fourth stage or cycle in summing plural inputs in accordance with an illustrative embodiment of the invention.
Figure 5A:
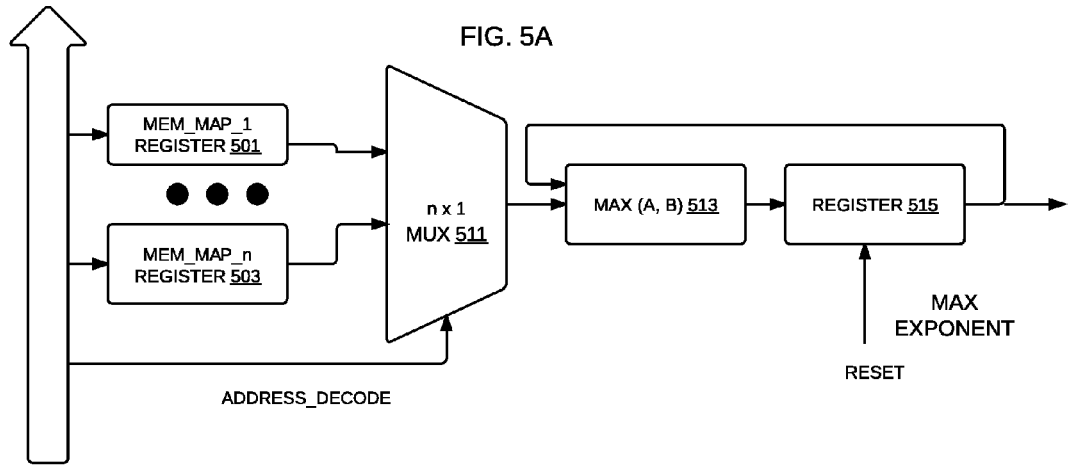
FIG. 5A is a block diagram of a first stage or cycle in summing plural floating point inputs in accordance with an illustrative embodiment of the invention.

FIG. 5A is a block diagram of a first stage or cycle in summing plural floating point inputs in accordance with an illustrative embodiment of the invention. Initially the target system maps the memory mapped registers 501-503 to multiplexer 511. The processing unit may provide an address to decode each of the memory mapped registers through multiplexer 511, thereby rotating through each addend, or at least each exponent, used in the current pass of broad-based addition. Maximizing circuit 513 retains, in register 515, the larger of multiplexer 511 output and any previously determined maximum exponent. Once all broad-based adder size inputs are decoded, a maximum exponent is determined for the block quantity of numbers to be added. Accordingly, max exponent 517, the maximum exponent, is stored to register 515 and the next cycle may begin.

Figure 5B:
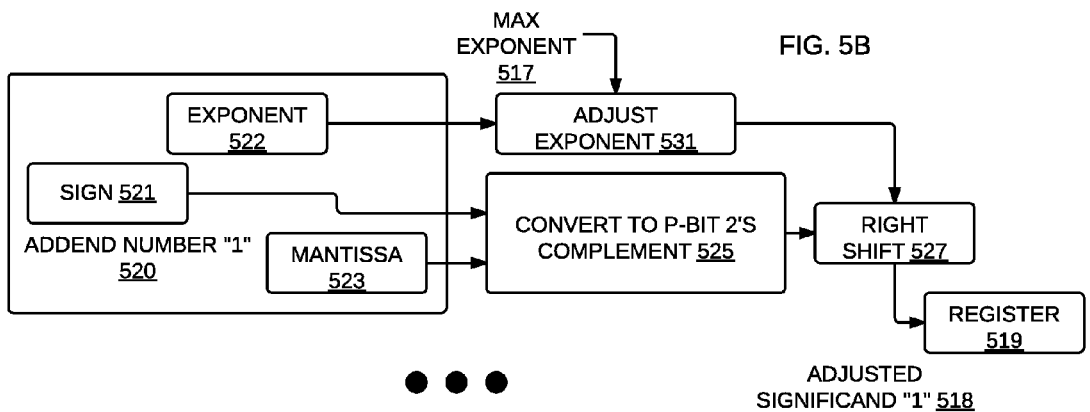
FIG. 5B is a block diagram of a second stage or cycle in summing plural inputs in accordance with an illustrative embodiment of the invention.
Figure 5B:
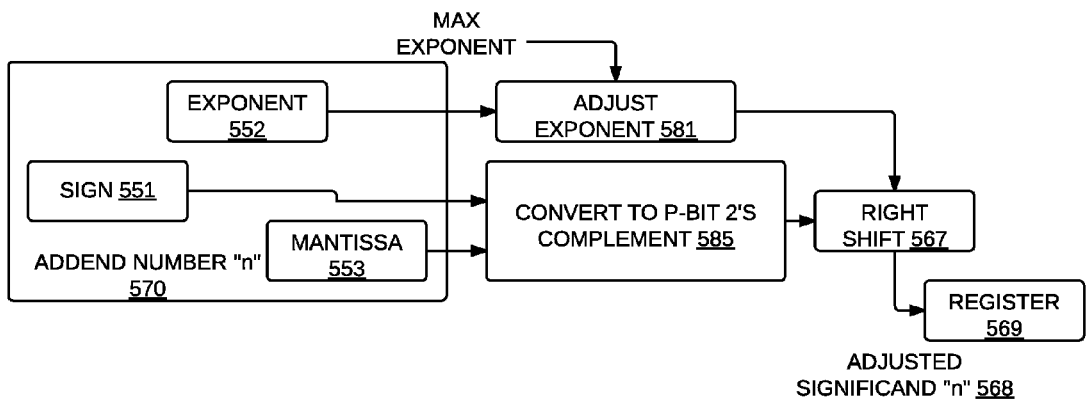

FIG. 5B is a block diagram of a second stage or cycle in summing plural inputs in accordance with an illustrative embodiment of the invention. Each memory mapped register stores an addend, for example addend number "1" 520 and addend number "n" 570, which may form the beginning and end, respectively, of a block of addends. The addends are formed by sign 521 exponent 522 and mantissa 523 for the addend number "1", and sign 551, exponent 552 and mantissa 553 for addend number, "n". The maximum exponent determined in cycle 1 now forms an input to adjust exponent circuits 531 and 581. The adjust exponent circuits determine a number of places to shift the mantissa to get all addends to have matched exponents. The 'p' can be the number of mantissa bits added to one and the logarithm of n. Accordingly, in this example, the convert to p-bit 2's complement circuits 525 and 585 perform a 2's complement with respect to the p-bits, in this case 16 bit positions. P may be selected to be the number of mantissa bits, plus one.

The 2's complement results are then right shifted, if at all, by max exponent—the exponent associated with the mantissa. The target system performs these shifts by using right shift 527 or right shift 567. The result is called an adjusted significand. The adjusted significand corresponding to the addend number "1" 518 is stored to register 519, while the adjusted significand corresponding to the addend number "n" 568 is stored to register 569. These significands, and the intervening significand for the remaining addends (not shown), are passed to the hardware of FIG. 5C or the third stage.

FIG. 5C is a block diagram of a third stage or cycle in summing plural inputs in accordance with an illustrative embodiment of the invention. Registers 519 and 569 as well as intervening registers form n inputs to p-bit n-number Wallace tree adder 571. The p-bit n-number Wallace tree adder is merely exemplary, as many other broad-based adders may be used. The p-bit n-number Wallace tree adder 571 stores its sum to register 575 as a denormalized significand, which is among the inputs for the fourth stage or cycle.

FIG. 5D is a block diagram of a fourth stage or cycle in summing plural inputs in accordance with an illustrative embodiment of the invention. The denormalized significand is presented to a priority encoder followed by shift 591. The priority encoder is controlled by the max_exponent 517 in register 515 of FIG. 5A. Next, the rounding circuit 595 rounds the result to comply with the precision limitations of the target system. The precision may be single precision, double precision, or any other level of precision. The outcome of rounding is stored to register 599.

Figure 6:
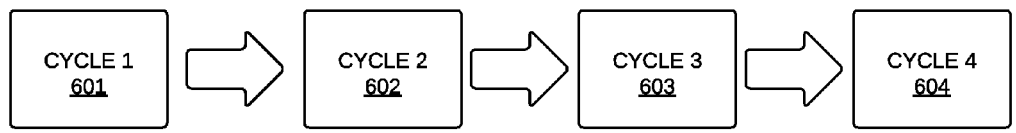
FIG. 6 is a diagram of cycles that use an alternative hardware embodiment to sum n floating point addends in accordance with an illustrative embodiment of the invention.

FIG. 6 is a diagram of cycles that use an alternative hardware embodiment to sum n floating point addends in accordance with an illustrative embodiment of the invention. The hardware of FIGS. 6-11 can use, for example, floating point numeric represented as described in IEEE 854 double-precision floating point standard. Cycle 1 601 determines a maximum exponent for positive signed addends and a maximum exponent for negative signed addends. Cycle 2 602 produces adjusted significands for positive numbers, if any, and adjusted significands for negative numbers, if any. Cycle 3 603 produces a denormalized significand for positive numbers, if any, and a denormalized significand for positive numbers, if any. Cycle 4 604 normalizes each of the denormalized significands of cycle 3 to produce normalized values. Each of these cycles is explained in greater detail below.

Figure 7:
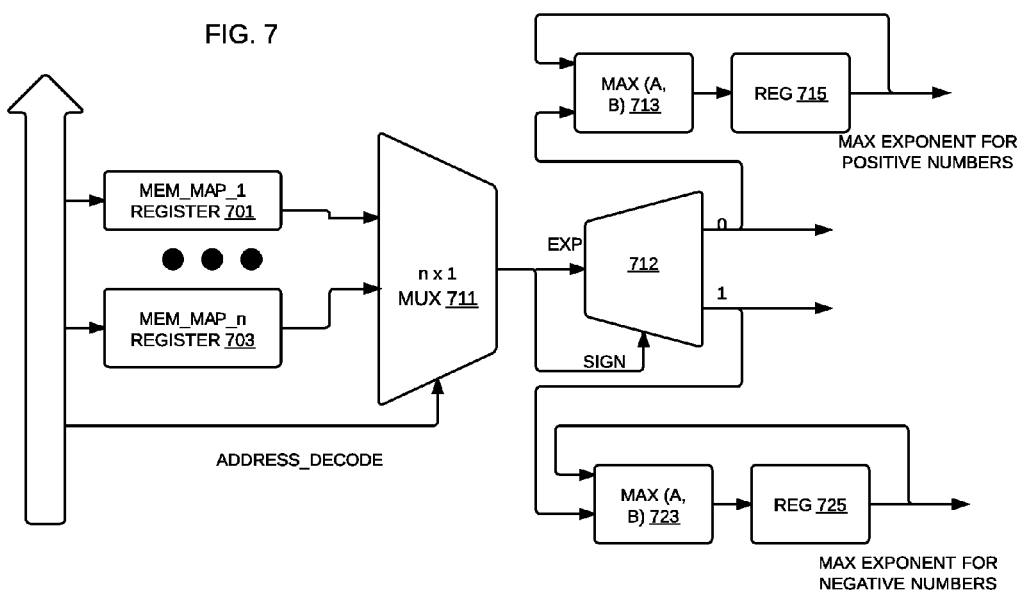
FIG. 7 is a block diagram of a first stage or cycle for summing plural floating point inputs in accordance with an alternative hardware embodiment of the invention.

FIG. 7 is a block diagram of a first stage or cycle for summing plural floating point inputs in accordance with an alternative hardware embodiment of the invention. Like the hardware of FIGS. 4 and 5A-5B, the alternative hardware embodiment is embedded in a target system. Various control inputs, for example, to select storage arrays and enable the adders, are generated by a general purpose processor of the target system. Generally, the first stage determines, for groups of n addends, the maximum exponent for those addends that are positive, and a second maximum exponent for those addends that are negative. The circuit is initialized by setting registers 715, 725 to zero. The registers can be set, accordingly, by the target system. The selection of memory to be mapped to registers 701, 703 is also controlled by the target system. An address decode signal selects one of the n addends that appears at inputs to multiplexer 711. These inputs include mem_map_1 register 701 through mem_map_n register 703. Multiplexer 711 admits at least the exponent and sign portions of each addend. The sign portion is directed to the control inputs to demultiplexer 712 to select the output to which at least the exponent portion appears. A positive sign causes the exponent to be directed to maximum determining circuit 713. Maximum determining circuit 713 has a second input, which is a previously stored maximum exponent stored at register 715.

Conversely, a negative sign at the control input to demultiplexer 712 directs the exponent to the negative output and to maximum determining circuit 723 for negative addends. Maximum determining circuit compares this new input to a previously stored, if any, maximum exponent from register 725.

Repeated selection of each of the addends among, for example, n addends, results a maximum exponent for positive signed addends in register 715 and a maximum exponent for negative signed addends in register 725. These maximum values are further used in the second cycle, described below.

Figure 8:
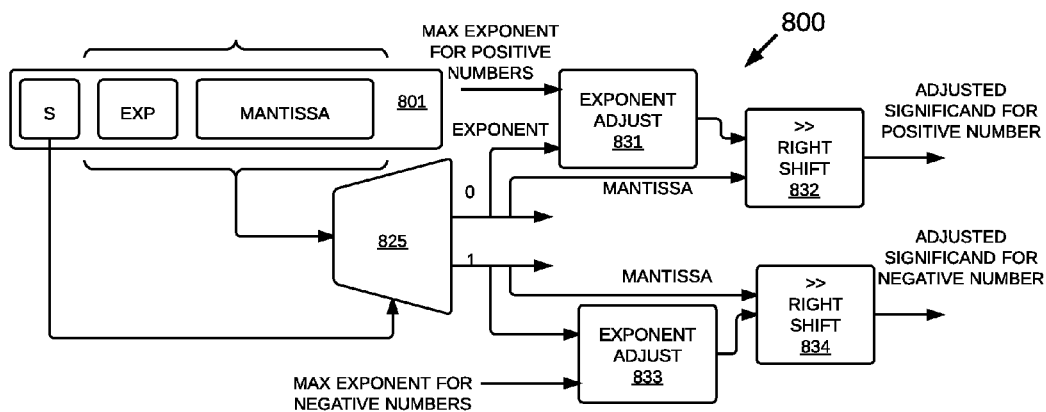
FIG. 8 is a block diagram of a second stage or cycle in summing plural floating point inputs in accordance with an alternative hardware embodiment of the invention.

FIG. 8 is a block diagram of a second stage or cycle in summing plural floating point inputs in accordance with an alternative hardware embodiment of the invention. A copy of the second stage is present for each addend to further process each addend into an adjusted significand. In other words, the size of the broad-based adder, n, determines the number of instances of cycle 2 circuit 800. An adjusted significand is the mantissa right shifted by the difference between its associated exponent and the maximum exponent in the same-signed class of addends among the group of n addends. In the instance of the second stage corresponding to the first addend, for example, as stored to register 801, the sign bit of the addend selects or sorts the addend into one of two paths in the second cycle circuit. If the sign is positive, the exponent is directed to exponent adjust 831, while the mantissa is directed to right shift circuit 832. The exponent is compared to the previously determined max exponent for positive numbers to obtain a difference, which, in turn, controls the number of right shifts to apply to the mantissa in right shift circuit 832. Accordingly, the bare mantissa is converted to the adjusted significand for the positive number. No sign is associated with this mantissa since the mantissa's presence in the right shift output indicates its status as positive.

Similarly, the case of a negative-signed addendend causes demultiplexer 825 to direct the exponent to exponent adjust circuit 833 to compare it with the max exponent for negative numbers to generate a difference input to right shift circuit 834. Right shift circuit 834 shifts the corresponding mantissa right to generate adjusted significand for negative numbers.

The combined effect of the operation of n instances of cycle 2 circuit 800 generates n adjusted significands for positive numbers and n adjusted significands for negative numbers, which are used in the next cycle, cycle 3.

Figure 9:
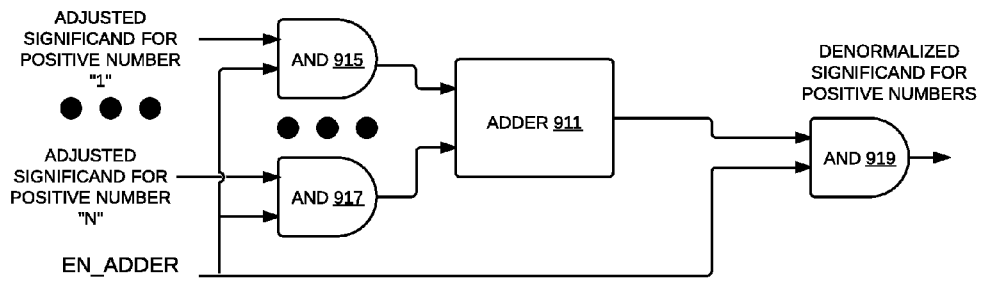
FIG. 9 is a block diagram of a third stage or cycle in summing plural floating point inputs in accordance with an alternative hardware embodiment of the invention.
Figure 9:
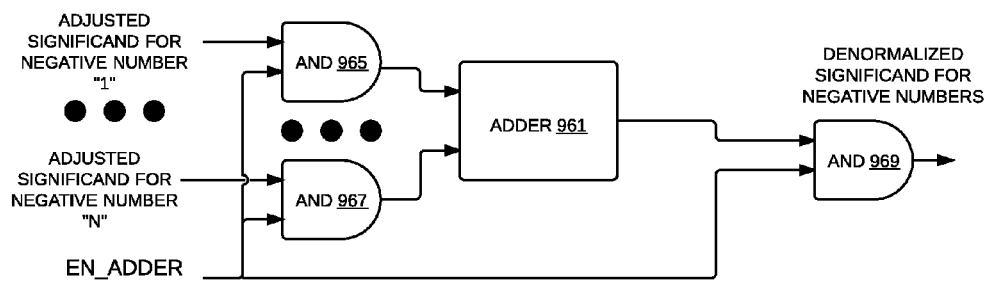

FIG. 9 is a block diagram of a third stage or cycle in summing plural floating point inputs in accordance with an alternative hardware embodiment of the invention. The group of n adjusted significands for the positive numbers are handled as a group in adder 911 which is specifically for positive number additions. The adder accepts inputs and produces outputs in response to the application of en_adder signal to AND gates 915, 917 and 919.

On the other hand, the group of n adjusted significands for the negative numbers are handled as a group on an adder 961, which is allocated for the negative number additions, only. The adder accepts inputs and produces outputs in response to the application of en_adder signal to AND gates 965, 967 and 969. The en_adder signal may be under the control of a general purpose processor under program control. Cycle 3 produces a subtotal called denormalized significand for positive numbers and a subtotal called denormalized significand for negative numbers. The denormalized significand for positive numbers is a mantissa that retains the max exponent for positive numbers associated with the previous pass of n addends through cycle 1, described in FIG. 7, above. This significand is the total, at least with respect to the n addends. Similarly, the denormalized significand for negative numbers is a mantissa that retains the max exponent for negative numbers associated with the previous pass of n addends through cycle 1, described in FIG. 7, above. Each of the two significands is applied to the inputs of cycle 4.

Figure 10:
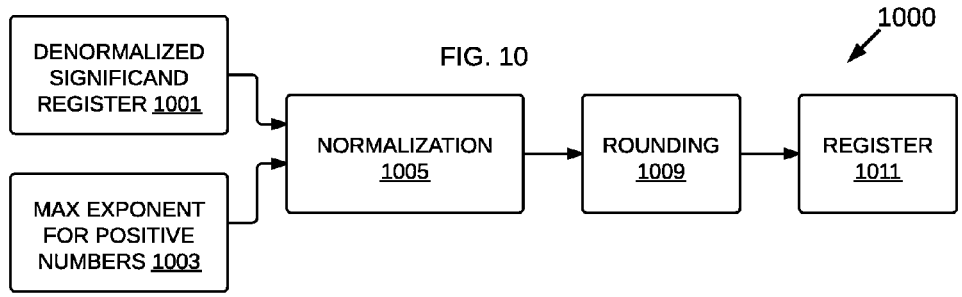
FIG. 10 is a block diagram of a fourth stage or cycle in summing plural floating point inputs in accordance with an alternative hardware embodiment of the invention.
Figure 10:
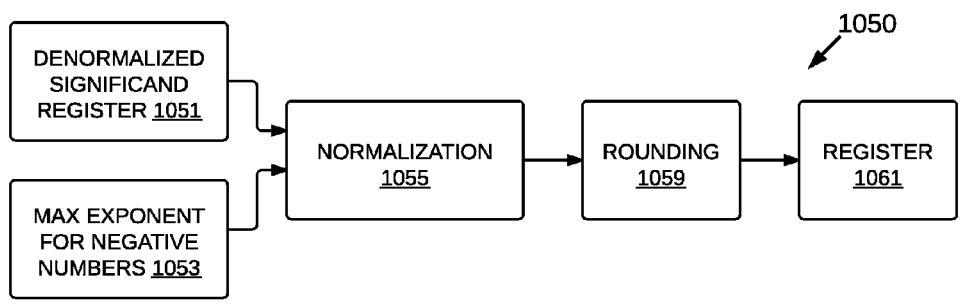

FIG. 10 is a block diagram of a fourth stage or cycle in summing plural floating point inputs in accordance with an alternative hardware embodiment of the invention. Cycle 4 uses positive half 1000 of its circuits to adjust the denormalized significand for positive numbers to a normalized value. Accordingly, positive half 1000 places in register 1011 a floating point value, including an exponent and sign. Similarly, Cycle 4 uses negative half 1050 of its circuits to adjust the denormalized significand for negative numbers to a normalized value.

Accordingly, the output of AND 919 of FIG. 9, denormalized significand register 1001, containing the denormalized significand for positive numbers is applied to normalization circuit 1005. Accordingly, the significand can be rotated to normalize the significand. In other words, any leading zero bits to the left of the most significant one bit are rotated out of a normalization register and corresponding zeros are rotated in from the right until the most significant non-zero bit is rotated out of the register and becomes the hidden bit. Next, the result is passed to rounding circuit 1009 which examines bits right of the mantissa field to determine if a round-up rule is met, and applies such a rounding-up if the round-up rule is met. Next, the mantissa, now normalized and rounded, is placed in register 1011.

As for the negative half 1050, the denormalized significand register 1051, containing the denormalized significand for negative numbers, is applied to normalization circuit 1055. The significand is accordingly normalized and passed to rounding circuit 1059. Rounding circuit 1059 applies the applicable rounding rules to round the normalized significand. The signal input to rounding 1059 has p-bits of content, while the signal output from rounding 1059 can be the precision specified by the floating point standard implemented in the circuit, for example, IEEE 854. The resulting negative sum for the negative 'n' addends that were processed at the inputs to cycles 1 and 2, is now placed in register 1061, subject to the error constraints of the system. The subtotals for each of the positive and negative addend sets are kept separate to avoid a potential catastrophic cancellation. A next step after determining the sum of all negative addends and all positive addends is to either compute a sum of these two subtotals, for example, with conventional instructions in a central processing unit, such as, for example processor 106 of FIG. 1. Alternatively, the next step can be to direct these subtotals to the broad-based adder for a final sum that accounts for all addends of the storage array.

At least the circuits described in FIGS. 2, 5A-5B, 7, 8, 9 and 10 are realized in hardware, for example, using circuit integration techniques to add the circuits to, for example, a common chip. The various circuits can, in some cases, rely on libraries of existing geometry and rules for layout of circuits to materials such as silicon. Where AND gates are depicted, the compact form of an AND gate is used to show plural AND gates that are each tied to en_adder signal used to activate transmission of a second AND input to the output of the AND gate. For example, in FIG. 2, the AND 205 is shown to be driven by Mem_map_1 register 201, in a fixed point illustrative embodiment. It is understood that the Mem_map_1 register has a fixed number of bits and that each such bit is applied to a distinct AND gate for delivery to adder 211. Thus, where Mem_map_1 register holds 'p' bits, 'p' AND gates are represented as the AND 205, and the en_adder signal drives the second input of each of those AND gates.

Furthermore, for FIG. 9, AND 915, the number of AND gates that AND 915 corresponds to, is the number of bits in adjusted significand for positive number "1". That is, the first adjusted signficand for positive number, which is an intermediate result, has 'x' bits of precision. Accordingly, there will be 'x' AND gates used to implement AND 915, with each AND gate having one input tied to the en_adder signal. Similar compact-style figure notations are made with respect to AND gates 207, 215 of FIG. 2, as well as AND gates 917, 919, 965, 967 and 969 of FIG. 9. Moreover, the AND gates represented in the ellipses of FIGS. 2 and 9 are similarly used to gate plural bits of the respective fixed place addend, adjusted significand for positive numbers, adjusted significand for negative numbers and interim sums in and from the respective adders. The AND gates themselves may serve to reduce power consumption during times that the adders of FIGS. 2 and 9 are not being used. Accordingly, the AND gates can be a useful feature in some embodiments of the invention.

It is appreciated that some Figures can implement the adder as a Wallace tree adder. The use of a Wallace tree adder is merely exemplary, and not limiting. Accordingly, other forms of three or more input adders can be used and are within the scope of the meaning of broad-based adder.

The illustrative embodiments permit a number of addends to be summed simultaneously in an adder where the adder has n inputs, that are more than two inputs for addends. In situations where there are many times the 'n' addends to be added to reach a single sum, the illustrative embodiments provide for a software instruction mapping method to convert conventional summation loops to corresponding signaling and instructions in a processing unit modified to use adders or pipelined adders where each pass sums three or more addends to reach either a total or a subtotal. Among the simpler embodiments, up to n addends can be added in a single clock cycle to obtain a sum, which compares favorably to the $\log_2(n)$ cycles a normal two-input adder might consume. Further speed advantages may be possible for very large numbers of addends, using the embodiments shown herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or computer readable tangible storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for driving signals to an adder, the computer implemented method comprising:
    a target system receiving general-purpose code for iterative summation of an aggregate number of addends, wherein each addend has a precision;
    the target system setting a first set of input registers to be a target of memory mapped registers;
    the target system using a broad-based adder to generate an adder result, wherein the broad-based adder has a broad-based adder size of inputs, and the broad-based adder size is less than the aggregate number of addends and greater than two, wherein each input register of the first set of input registers is connected to each input;
    the target system writing the adder result to a storage array in memory, wherein the adder result is the sum of the inputs and the adder result is placed in the storage array as indexed by a storage array index;
    the target system incrementing a first memory address by the broad-based adder size, wherein an increment corresponds to the precision;
    the target system incrementing the storage array index corresponding to the storage array;
    the target system determining whether no unsummed addends remain; and
    responsive to a determination that no unsummed addends remain, the target system summing the storage array in memory to obtain a final sum.

2. The computer implemented method of claim 1, wherein the summing the storage array in memory further comprises:
    iterating over the storage array in memory a number of times equal to a ceiling of a quotient of the aggregate number of addends divided by the square of the broad-based adder size to form a first block quantity of numbers to add, wherein the iterating comprises:
    initializing an outer loop counter;
    first determining whether a first exit condition is not met, based on the outer loop counter;
    responsive to a determination that the first exit condition is not met, initializing an inner loop counter;
    determining whether the inner loop counter is less than or equal to the first block quantity of numbers to add;
    responsive to a determination that the inner loop counter is less than or equal to the block quantity of numbers to add, direct memory transferring from memory to registers coupled to inputs of broad-based adder, wherein memory comprises a start address through a destination address;
    the broad-based adder adding inputs to produce output in the storage array indexed by the inner loop counter;
    incrementing the start address by the first number;
    incrementing the inner loop counter;
    setting a second block quantity, wherein the second block quantity is a ceiling of a quotient of the first block quantity divided by the broad-based adder size;
    incrementing the outer loop counter;
    determining whether the first exit condition is met; and
    responsive to a determination that the first exit condition is met, storing an output of the broad-based adder as the final sum.

3. The computer implemented method of claim 1, wherein the receiving general-purpose code comprises detecting iterative summations of the aggregate number of addends, wherein the setting the first set of input registers to be the target of memory mapped memory is responsive to detecting iterative summations.

4. The computer implemented method of claim 2, wherein the addends are floating point represented addends.

5. The computer implemented method of claim 4, further comprising converting a mantissa and a hidden 1-bit to p-bit 2's complement and right shifting the mantissa at least one bit to form an adjusted significand, wherein a first addend has a lower exponent than a second addend, wherein the converting and right shifting is prior to using the broad-based adder to generate the adder result.

6. The computer implemented method of claim 4, wherein the broad-based adder receives addends using the storage array, wherein the storage array is specified in the general-purpose code.

7. The computer implemented method of claim 1, wherein the first memory mapped address is offset from a second memory mapped address by the broad-based adder size minus 1 offset from the second memory mapped address.

8. A computer program product for driving signals to an adder, the computer program product comprising:
    a computer readable storage device having computer usable program code embodied therewith, the computer usable program code comprising:
        computer usable program code configured to receive general-purpose code for iterative summation of an aggregate number of addends, wherein each addend has a precision;
        computer usable program code configured to set a first set of input registers to be a target of memory mapped registers;
        computer usable program code configured to use a broad-based adder to generate an adder result, wherein the broad-based adder has a broad-based adder size of inputs, and the broad-based adder size of inputs is less than the aggregate number of addends and greater than two, wherein each input register of the first set of input registers is connected to each input;
        computer usable program code configured to write the adder result to a storage array in memory, wherein the adder result is the sum of the inputs, and the adder result is placed in the storage array as indexed by a storage array index;
        computer usable program code configured to increment the first memory address by the broad-based adder size, wherein an increment corresponds to the precision;

computer usable program code configured to increment the storage array index corresponding to the storage array;
computer usable program code configured to determine whether no unsummed addends remain; and
computer usable program code configured to sum the storage array in memory to obtain a final sum, responsive to a determination that no unsummed addends remain.

9. The computer program product of claim 8, wherein computer usable program code to sum the storage array in memory further comprises:
computer usable program code configured to iterate over the storage array in memory a number of times equal to a ceiling of a quotient of the aggregate number of addends divided by the square of the broad-based adder size to form a first block quantity of numbers to add, wherein computer usable program code configured to iterate comprises:
computer usable program code configured to initialize an outer loop counter;
computer usable program code configured to first determine whether a first exit condition is not met, based on the outer loop counter;
computer usable program code configured to set an inner loop counter, responsive to a determination that the first exit condition is not met;
computer usable program code configured to determine whether the inner loop counter is less than or equal to the first block quantity of numbers to add;
responsive to a determination that the inner loop counter is less than or equal to the block quantity of numbers to add, direct memory transfer from memory to registers coupled to inputs of broad-based adder, wherein memory comprises a start address through a destination address;
computer usable program code configured to add inputs to produce output in the storage array indexed by the inner loop counter using the broad-based adder;
computer usable program code configured to increment the start address by the first number;
computer usable program code configured to increment the inner loop counter;
computer usable program code configured to set a second block quantity, wherein the second block quantity is a ceiling of a quotient of the first block quantity divided by the broad-based adder size;
computer usable program code configured to increment the outer loop counter;
computer usable program code configured to determine whether the first exit condition is met; and
computer usable program code configured to store the output of the broad-based adder as the final sum, responsive to a determination that the first exit condition is met.

10. The computer program product of claim 8, wherein computer usable program code configured to receive general-purpose code comprises computer usable program code configured to detect iterative summations of the aggregate number of addends, wherein computer usable program code configured to set the first set of input registers to be the target of memory mapped memory is responsive to computer usable program code to detect iterative summations.

11. The computer program product of claim 9, wherein the addends are floating point represented addends.

12. The computer program product of claim 11, further comprising computer usable program code configured to convert a mantissa and a hidden 1 bit to p-bit 2's complement and computer usable program code configured to right shift the mantissa at least one bit to form an adjusted significand, wherein a first addend has a lower exponent than a second addend, wherein the computer usable program code configured to convert and computer usable program code configured to right shift is operable prior to computer usable program code configured to use the broad-based adder to generate the adder result.

13. The computer program product of claim 11, wherein the broad-based adder receives addends using the storage array, and wherein the storage array is specified in the general-purpose code.

14. The computer program product of claim 8, wherein the first memory mapped address is offset from a second memory mapped address by the broad-based adder size minus 1 offset from the second memory mapped address.

15. A data processing system comprising:
a bus;
a computer readable tangible storage device connected to the bus, wherein computer usable code is located in the computer readable tangible storage device;
a communication unit connected to the bus; and
a processing unit connected to the bus, wherein the processing unit executes the computer usable code for driving signals to an adder, wherein the processing unit executes the computer usable program code to receive general-purpose code for iterative summations of an aggregate number of addends, wherein each addend has a precision; set a first set of input registers to be a target of memory mapped registers; use a broad-based adder to generate an adder result, wherein the broad-based adder has a broad-based adder size of inputs, and the broad-based adder size is less than the aggregate number of addends and greater than two, wherein each input register of the first set of input registers is connected to each input; write the adder result to a storage array in memory, wherein the adder result is the sum of the inputs, and the adder result is placed in the storage array as indexed by a storage array index; increment the first memory address by the broad-based adder size, wherein an increment corresponds to the precision; increment the storage array index corresponding to the storage array; determine whether no unsummed addends remain; and sum the storage array in memory to obtain a final sum, responsive to a determination that no unsummed addends remain.

16. The data processing system of claim 15, wherein in executing computer usable code to sum the storage array in memory, the processing unit further executes computer usable code to iterate over the storage array in memory a number of times equal to a ceiling of a quotient of the aggregate number of addends divided by the square of the broad-based adder size to form a first block quantity of numbers to add, wherein the iterating comprises:
initializing an outer loop counter;
first determining whether a first exit condition is not met, based on the outer loop counter;
setting an inner loop counter, responsive to a determination that the first exit condition is not met;
determining whether the inner loop counter is less than or equal to the first block quantity of numbers to add;
responsive to determining that the inner loop counter is less than or equal to the block quantity of numbers to add, direct memory transferring from memory to registers coupled to inputs of broad-based adder, wherein memory comprises a start address through a destination address;
using the broad-based adder to add inputs to produce output in the storage array indexed by the inner loop counter;
incrementing the start address by the first number;
incrementing the inner loop counter;
setting a second block quantity, wherein the second block quantity is a ceiling of a quotient of the first block quantity divided by the broad-based adder size;
incrementing the outer loop counter;
determining whether the first exit condition is met; and
storing an output of the broad-based adder as the final sum, responsive to a determination that the first exit condition is met.

17. The data processing system of claim 15, wherein in executing computer usable code to receive general-purpose code, the processing unit further executes computer usable code to detect iterative summations of the aggregate number of addends; and wherein in executing computer usable code to set the first set of input registers to be the target of memory mapped memory the computer usable code to set is responsive to computer usable program code to detect iterative summations.

18. The computer program product of claim 16, wherein the addends are floating point represented addends.

19. The data processing system of claim 15, wherein the processing unit further executes computer usable code to convert a mantissa and a hidden 1-bit to p-bit 2's complement and right shift the mantissa at least one bit to form an adjusted significand, wherein a first addend has a lower exponent than a second addend, wherein the converting and right shifting is operable prior to use the broad-based adder to generate the adder result.

20. The data processing system of claim 18, wherein the broad-based adder receives addends using the storage array and wherein the storage array is specified in the general-purpose code.

21. The data processing system of claim 15, wherein the first memory mapped address is offset from a second memory mapped address by the broad-based adder size minus 1 offset from the second memory mapped address.

22. An adder hardware unit comprising:
a first set of memory mapped input registers;
a multiplexer coupled to the memory mapped input registers to decode the memory mapped input register based on an address presented at a selection input of the multiplexer, the multiplexer having outputs of at least an exponent and a mantissa, wherein a bit of the outputs is a sign bit;
a demultiplexer for selecting the exponent and the mantissa of the multiplexer based on the sign bit, whereby a positive exponent and mantissa is directed to a positive output of the demultiplexer, and a negative exponent and mantissa is directed to a negative output of the demultiplexer;
a maximum positive exponent circuit for determining a maximum positive exponent among the first set of memory mapped input registers; and
a maximum negative exponent circuit for determining a maximum negative exponent among the first set of memory mapped input registers.

23. The adder hardware unit of claim 22, further comprising:
a significand adjusting circuit for shifting bits for each memory mapped input register based on at least one of the maximum positive exponent and the maximum negative exponent, whereby, for each value of each memory mapped input register a corresponding adjusted significand is produced.

24. The broad-based adder of claim 23, further comprising:
a first broad-based adder for adding at least one adjusted significand that is positive to form a first denormalized block sum of the at least one adjusted significand that is positive; and
a second broad-based adder for adding at least one adjusted significand that is negative to form a first denormalized block sum of the at least one adjusted significand that is negative.

25. The adder hardware unit of claim 23, wherein the first broad-based adder is a first Wallace tree adder and the second broad-based adder is a second Wallace tree adder.

* * * * *